May 3, 1938.  J. D. COLE  2,116,233

VACUUM CLEANER

Filed Dec. 21, 1936

INVENTOR.
JAMES D. COLE
BY Bates, Golrick, & Teare
ATTORNEYS

Patented May 3, 1938

2,116,233

UNITED STATES PATENT OFFICE 2,116,233

VACUUM CLEANER

James D. Cole, Kent, Ohio, assignor to The Black & Decker Electric Company, Kent, Ohio, a corporation of Ohio Application December 21, 1936, Serial No. 116,864

3 Claims. (Cl. 183—37)

This invention relates to an electric vacuum cleaner. The general object of the invention is to provide a simple and inexpensive cleaner which may be readily assembled in manufacture.

Another object of the present invention is to provide a cleaner of a comparatively small size, yet which will advantageously utilize a comparatively large filtering element, and to so arrange the element that it will be protected at all times.

It is likewise an object of the present invention to resiliently support the filtering element in such a manner as to retain the element expanded at all times, and yet to so arrange the support as to facilitate assembly or replacement of the filtering element.

Other objects of the present invention will become more apparent from the following description, reference being had to the accompanying drawing, in which I illustrate a preferred embodiment of my invention. The essential features of the invention will be summarized in the claims.

Figure 1:
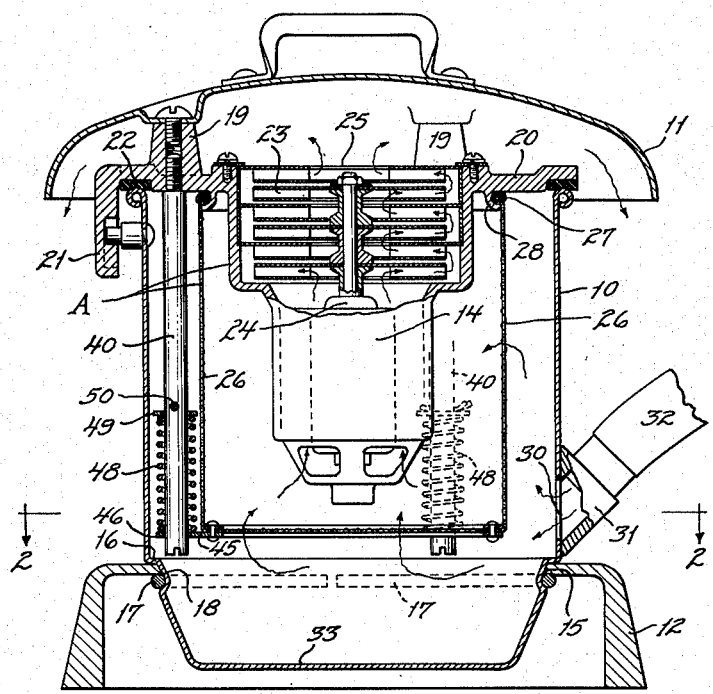
Figure 2:
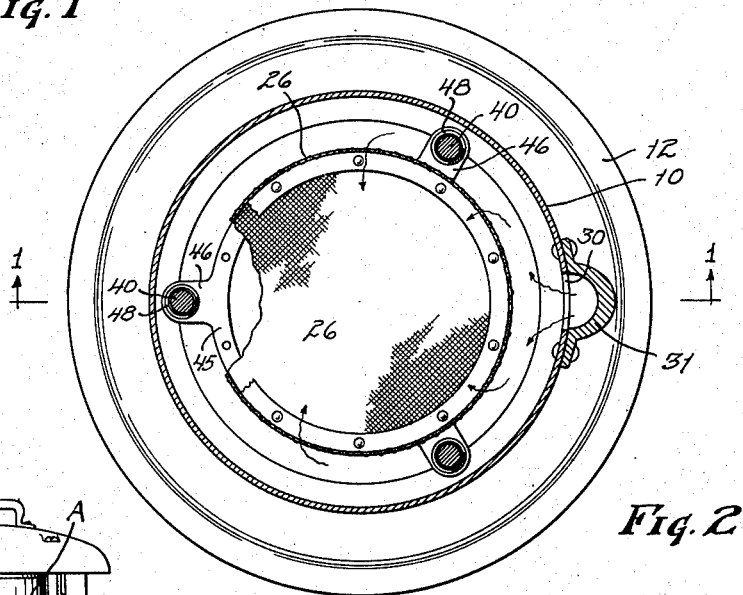
Figure 3:
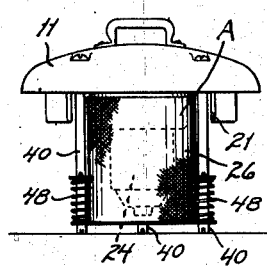

Referring now to the drawing, in which I illustrate a preferred form of my invention, Fig. 1 is a vertically extending, centrally located section through a preferred form of my invention, and is indicated by the lines 1—1 on Fig. 2; Fig. 2 is a horizontal section, as indicated by the lines 2—2 on Fig. 1; Fig. 3 is a view, on a smaller scale than Figs. 1 and 2, illustrating the filtering and power unit removed from the cleaner receptacle to permit cleaning of the receptacle.

My improved cleaner comprises an open topped, comparatively light-weight sheet-metal receptacle 10, into which a power filtering unit A is suspended by a cover 11. The receptacle is removably mounted on a protective base or skirt 12, the upper walls of which has an opening 15 through which the receptacle projects. An annular flange 16 formed by one wall of an angular recess 18 formed in the receptacle rests on the top wall of the base. A split ring 17 is placed in the recess 18 below the top wall of the base, thus removably securing the receptacle thereto. The side walls of the base are as illustrated more rigid than the walls of the receptacle and provide a protecting skirt therefor, and maintain the bottom of the receptacle spaced above the cleaner supporting surface, as well as counter-balancing the weight of the motor and filter unit.

The cover 11 comprises a sheet-metal member, which is secured to upstanding lugs 19 of a closure member 20. The closure member is removably secured to the receptacle by suitable securing means, such as the bayonet lock mechanism, generally indicated at 21. A packing ring 22 is interposed between the closure member and the upper wall of the receptacle to maintain an airtight connection therebetween. The closure member depends into the receptacle, and provides a housing for a multi-staged suction fan 23 and an electric motor 24, which is drivingly connected to operate the fan. The arrangement is such that the fan draws air from the motor and exhausts it through an opening 25 in the closure member from whence it escapes between the overhanging skirt of the cover and the walls of the receptacle, as indicated by the arrows in Fig. 1. This arrangement provides a chamber between the walls of the motor and fan housing, and the internal walls of the receptacle.

The filtering element comprises a bag-like member 26 of cloth, paper or similar flexible pervious material and has an upper hem in which is inserted a coil spring 27, rubber band or other constricting device, which retains the upper open end of the bag tightly on an angular depending ridge formation 28 of the closure member. As shown in Fig. 1, this filter bag encloses the fan and motor unit and is spaced apart from the walls thereof, as well as from the walls of the container or receptacle.

Dirt-laden air is drawn into the receptacle through an opening 30 in the wall of the receptacle 10. This opening is provided with a fitting 31, to which the usual cleaner hose arrangement 32 is secured in any well-known manner. Thus it will be seen that the dirt-laden air is drawn into the receptacle between the filtering element and the walls of the receptacle. The dirt removed by the filter drops into a pan-like formation 33 in the base of the receptacle.

The filter bag is resiliently maintained in an expanded position and spaced from the walls of the motor housing and the receptacle 10. As illustrated in Figs. 1 and 2 in the drawing, I have provided a series of posts 40 which are secured to the closure member 20 at spaced intervals and depend downwardly therefrom between the inner wall of the receptacle and filter bag 26. Secured to the bottom of the filter bag is a reinforcing ring 45, having a plurality of outwardly extending ears 46, each ear being provided with an opening through which the respective posts 40 extend. The bag is maintained taut by compression springs 48, which encircle the posts 40 between the ears 46 of the filter bag ring 45 and collar washers 49, the upper movement of which is limited by cotter pins 50.

This mechanism enables the bag to be readily positioned on the cleaner, either in the original assembly or when replacing the bag. To assemble the filter bag on the cleaner the operator slips the ring 45 of the bag into position on the posts 40, and secures the open end of the bag to the annular lip 28 of the closure member 20, and thereafter compresses the springs 48 and inserts the pins 50. It will thus be seen that this admits the positioning of the bag on the lid 27 of the closure member before the expanding tension is applied to the bag.

As illustrated in the drawing, and especially in Fig. 3, it will be noted that the posts 40 extend some distance below the bottom of the filter bag 26. Thus, when the cover, together with the filtering and power unit are removed from the receptacle, they may be placed as a unit on a supporting surface without danger of damage to the filter bag, the posts forming legs upon which the unit rests with the filter bag spaced above the supporting surface.

I claim:

1. In a vacuum cleaner having a hollow casing with a comparatively stiff wall, a cover therefor, a pump carried by said cover, a motor carried by the pump and depending into the receptacle, and a bag of flexible pervious material surrounding the motor and having its open end secured to said cover; the novel arrangement comprising a relatively rigid ring secured to the bottom of said bag, guides adapted to be carried by said cover in a manner to coact with said ring to maintain the bag in axial alignment with said receptacle, resilient means located outside of said bag and arranged to act on the ring to force it downwardly, and quickly releasable means to hold the resilient means in active position.

2. In an electric vacuum cleaner, having a vertically extending cylindrical receptacle, a cover member removably secured thereto, a motor-driven suction-producing means mounted on said cover and depending into the receptacle, a dust filter carried by said cover inside the receptacle and spaced from the side wall thereof, said suction-producing means having its inlet communicating with the interior of said filter and its outlet in said cover; the arrangement of means carried by said cover and extending downwardly below the lowermost extremity of said filter, and resilient means carried by the downwardly extending means to normally maintain the filter in a distended position, said first named means being adapted and arranged to support the cover and parts carried thereby in spaced relationship to a supporting surface, when removed from the receptacle.

3. In a vacuum cleaner having a hollow receptacle which is open at the top, a cover for the receptacle having a pump, motor and filter bag depending therefrom into the receptacle with the bag outside the pump and motor; the arrangement for distending the bag comprising rods depending from the cover outside the bag, coil springs on the rods adapted to be connected at their lower ends to a lower portion of the bag, and members quickly-detachably connected with the rods and arranged to hold the springs in stressed condition for retaining the bag taut.

JAMES D. COLE.